UNITED STATES PATENT OFFICE.

CHARLES R. BACON AND FRANK QUEEN, OF ST. JAMES, MINNESOTA.

COMPOSITION FOR REMOVING SCALE IN BOILERS.

SPECIFICATION forming part of Letters Patent No. 269,616, dated December 26, 1882.

Application filed May 5, 1882. (No specimens.)

*To all whom it may concern:*

Be it known that we, CHARLES R. BACON and FRANK QUEEN, of St. James, in the county of Watonwan and State of Minnesota, have invented a new and Improved Composition for Removing Scale in Boilers, of which the following is a full, clear, and exact description.

The object of our invention is to provide a new and improved composition of matter for removing calcareous deposits or scale in steam-boilers.

Our improved compound consists of the following ingredients, combined in the following proportions: Aqua calcis, or lime-water, and pure sweet-oil, sixteen ounces each. The lime-water, or aqua calcis, is composed of pure unslaked lime, one (1) ounce; soft water, eleven (11) ounces. Mix well and filter after standing ten or twelve hours. The sweet-oil and the lime-water are mixed and are used as follows: For example, if a ten-horse-power boiler running ten hours per day and evaporating about twelve barrels of water is used, a quantity of our improved compound not exceeding one pint is injected in some suitable manner every other day until the desired effect is produced—that is, until any old lime deposit (known as "scale") which may exist in the boiler is softened to such an extent that it can easily be removed by washing out the boiler in the usual way.

If there is no old deposit or scale in the boiler, and if the feed-water contains lime, any deposit that forms on the boiler plates or flues will be so soft that a stream of water from an ordinary force-pump will wash it away, leaving the plates and flues clean.

As our improved compound is a mixture of oil and water, it mixes readily with the water in the boiler and attacks all lime deposits alike and softens them. If the lime deposits are removed from the boiler, a great quantity of fuel will be saved. This compound does not remove the deposits, but softens them to such an extent that they can be washed off by means of a stream of water. Absolutely pure sweet-oil must be used, as common sweet-oil will not mix.

This compound is especially adapted to be used in small boilers where mechanical lime-extractors cannot be used. The oil also assists in lubricating the valves of the engine, as it is readily diffused throughout the steam. Oil alone will soften the deposit; but as oil does not mix well with water we prefer to mix it with lime-water.

Having thus described our invention, we claim as new and desire to secure by Letters Patent—

A compound for softening lime deposits in steam-boilers, consisting of lime-water, or aqua calcis, and pure sweet-oil, in the proportions herein stated.

CHARLES R. BACON.
FRANK QUEEN.

Witnesses:
GEO. P. JOHNSTON,
THOMAS TARSOM.